United States Patent
Maker

[15] 3,659,495
[45] May 2, 1972

[54] GEAR MAKING

[72] Inventor: Paul Maker, Marion, Mass.

[73] Assignee: Bird Island, Inc., Boston, Mass.

[22] Filed: Aug. 25, 1970

[21] Appl. No.: 66,739

[52] U.S. Cl. .......................................................... 90/3, 90/6
[51] Int. Cl. ........................................................... B23f 5/20
[58] Field of Search ............................................... 90/3, 4, 6

[56] References Cited

UNITED STATES PATENTS 1,626,821  5/1927  Head ........................................... 90/6

*Primary Examiner*—Francis S. Husar
*Attorney*—Robert E. Hillman

[57] ABSTRACT

Apparatus for making gears of hyperboloidal form, comprising a cutter having profile generating cutting edges mounted for movement about a common axis, and a support for a workpiece rotatable about a workpiece axis; the support and the cutter being mounted for relative pivotal movement about a feed axis nonparallel to the workpiece axis; the support and the cutter having basic rates of simultaneous movement about the workpiece and cutter axes, respectively, in the absence of the pivotal movement, in ratio dependent upon the number of cutting edges to the number of teeth in the gear, to cause continuous indexing of the workpiece as the cutting edges make successive cuts adjacent the profiles; the support and the cutter being mounted so that one of the basic rates is increased or decreased, upon occurrence of the pivotal movement, by a differential rate dependent upon the angular rate of the pivotal movement, so that successive cuts adjacent each tooth profile will follow the desired contour thereof.

7 Claims, 4 Drawing Figures

Patented May 2, 1972

3,659,495

GEAR MAKING

This invention relates to making gears having conical or other hyperboloidal pitch surfaces (the term hyperboloidal being used in its broadest mathematical sense, to include, e.g., the limiting case of the cone).

Objects of the invention are to provide for improved, high-speed, high-accuracy production of such gears with apparatus capable of continuously indexing in the general manner disclosed in U.S. Pat. Applications Ser. No. 844,925 (Paul Maker, filed July 25, 1969) and now U.S. Pat. No. 3,595,130 and Ser. No. 11,503 (Paul Maker, filed Feb. 16, 1970).

The invention features a cutter having profile generating cutting edges mounted for movement about a common axis, and a support for a workpiece rotatable about a workpiece axis; the support and the cutter being mounted for relative pivotal movement about a feed axis nonparallel to the workpiece axis; the support and the cutter having basic rates of simultaneous movement about the workpiece and cutter axes, respectively, in the absence of the pivotal movement, in ratio dependent upon the number of cutting edges to the number of teeth in the gear, to cause continuous indexing of the workpiece as the cutting edges make successive cuts adjacent the profiles; the support and the cutter being mounted so that one of the rates is increased or decreased, upon occurrence of the pivotal movement, by a differential rate dependent upon the angular rate of the pivotal movement, so that successive cuts adjacent each tooth profile will follow the desired contour thereof. In preferred embodiments the profile generating cutting edges lie along straight lines in substantially a common plane, and, for producing bevel gears, the feed axis lies in the plane of the profile generating cutting edges and intersects the workpiece axis. In other preferred embodiments the feed and workpiece axes lie outside the plane of the profile generating cutting edges, and the feed axis does not intersect the workpiece axis, for producing gears having non-conical hyperboloidal pitch surfaces.

Other objects, features, and advantages will appear from the following description of a preferred embodiment of the invention, taken together with the attached drawings, in which.

Figure 2:
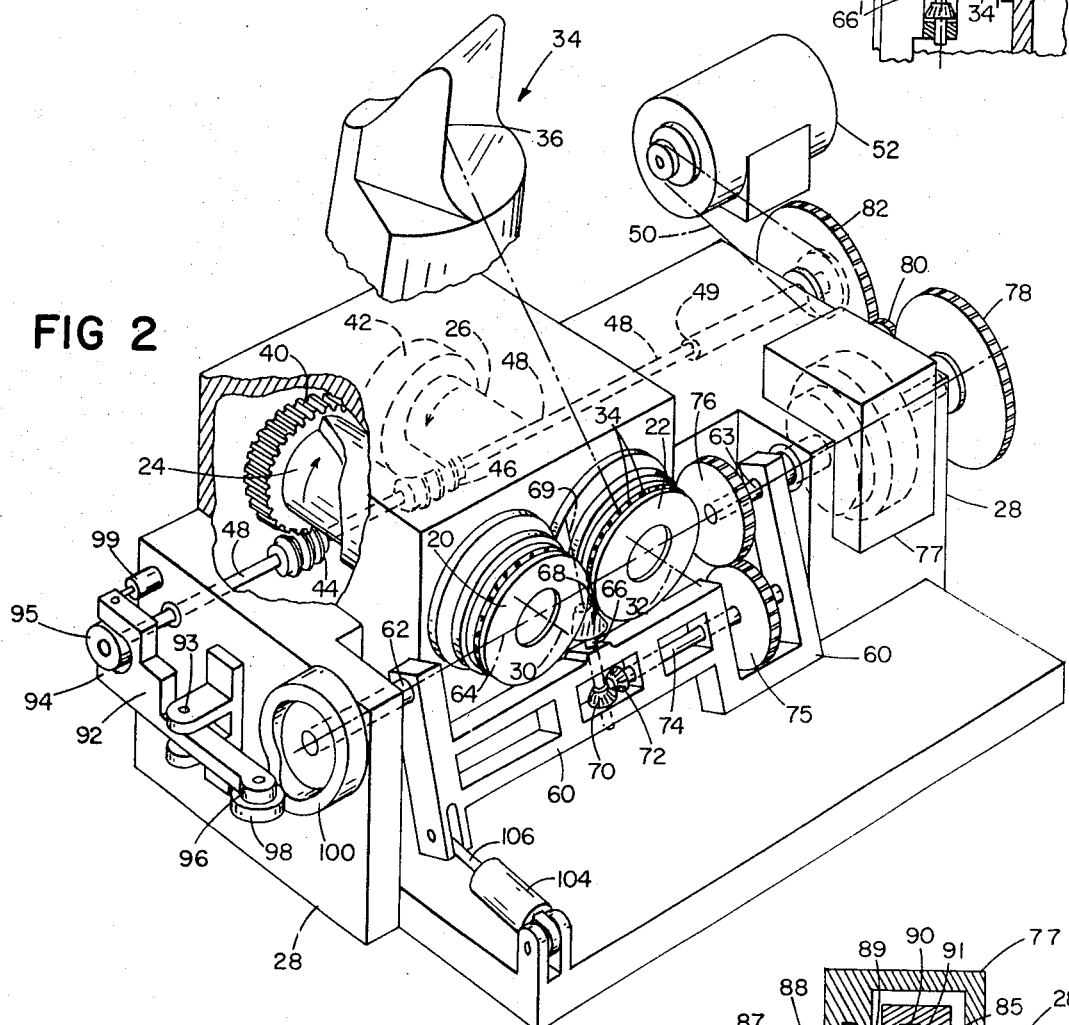
FIG. 2 is a semi-schematic diagram of apparatus for making the gear of FIG. 1, with an exploded fragment of one cutting tool shown in enlarged scale.

Referring to the drawings, the particular embodiment illustrated in FIG. 2 will generate the profiles 10 of spiral bevel pinion gear 12, pinion 12 being a bevel gear in the conventional sense that its axis will intersect that of its mating bevel gear (not shown).

Rotary cutters 20 and 22 are fixed on spindles 24 and 26, respectively, supported in frame 28 for rotation about parallel cutter axes 30 and 32. The cutters are of the type described in the above-identified applications, and each includes a series of tools 34 with radial straight-line profile generating cutting edges 36 lying in substantially (in the sense of, e.g., permitting a slight cone angle for crowning, as described in said application Ser. No. 844,925a single plane perpendicular to the cutter axis. The spindles are rotated in the directions indicated by the arrows through worm wheels 40 and 42 and worms 44 and 46 mounted on shaft 48. Shaft 48 is supported in frame 28, is splined at 49 to permit telescoping, and driven through belt 50 by a motor 52.

Carriage 60 is pivoted to frame 28 by shafts 62 and 63 which define feed axis 64 spaced above axes 30 and 32 and lying in the plane of cutting edges 36. Workpiece support spindle 66 carries gear blank 68 as a workpiece and is rotated about axis 69 (which intersects axis 64 at 90°) through bevel gears 70, 72 by shaft 74 journaled in carriage 60 and in turn rotated through a train consisting of transfer gears 75 and 76 respectively mounted on shafts 74 and 63, differential 77 driven through gear 78, gear 80 mounted on the frame, and gear 82 mounted on shaft 48. Differential 77 consists of internal gear 83 fixed to gear 78 through shaft 84 and surrounding sun gear 85 fixed to shaft 63; internal gear 86 fixed to base 28 through the housing of differential 77 and surrounding sun gear 88 fixed to carriage 60 through collar 87 which surrounds shaft 63; and planetary gears 89 and 90 which respectively mesh between the two internal and sun gear pairs and are rotatably carried on a common free shaft 91.

When the carriage 60 is positioned so that workpiece axis 69 is perpendicular to the plane of cutter axes 30 and 32, each cutter axis must intersect at 90° a perpendicular bisector of an element of the generating (base) cone of gear 12 which passes through axis 69.

Lever 92 is pivoted to frame 28 at 93, has one end 94 pinned to collar 95 on shaft 48, and has on its other end 96 a roller 98 which is held by power cylinder 99 (which acts as a spring) against cam 100 mounted on shaft 62.

Power cylinder 104 is mounted on frame 28 and has its rod 106 fixed to carriage 60 to pivot the carriage about axis 64.

In operation, with carriage 60 stationary, rotation of shaft 48 will cause rotation of the cutters and support 66 at basic indexing rates having a ratio equal to the ratio of the number of tools 34 (per cutter) to the number of teeth in gear 10, as required to produce the continuous indexing with successive tools entering successive toothspaces in sequence as described in the above-mentioned application. In particular, the rotation of gear 78 is transmitted through differential 77 to shaft 63, since the absence of free movement of carriage 60 fixes the planetary and rotational position of gear 88 and thus requires that rotation of gear 83 produce rotation of gear 85.

Cylinder rod 106 is retracted so that workpiece 68 can be loaded on support 66, the workpiece being positioned so that the vertex of the pitch cone of the gear to be cut lies on axis 64. Cylinder 104 is then expanded, pivoting carriage 60 toward the cutters to bring the workpiece into the paths of tools 34. The pivoting of carriage 60 does not change the rate of rotation of the workpiece since the rotation of sleeve 87 and hence gear 88 with the carriage will produce planetary motion of gears 89 and 90, and hence rotation of gear 85, shaft 63, and gear 76 just sufficient to eliminate any rotation of gear 75 about its own axis.

As the carriage pivots, shaft 62 and cam 100 rotate correspondingly, causing lever 92 to pivot and hence the portion of shaft 48 carrying worms 44 and 46 to translate, all at rates proportional to the angular rate of movement of the carriage. The translation of the worms superimposes upon the basic cutter rotation differential rotations at a rate proportional to the angular rate of workpiece feed, and causes successively deeper cuts in each toothspace to be tangent to the desired involute tooth profile. The constant of proportionality associated with the differential cutter rotations is of course controlled by the position of lever arm pivot 93, the shape of cam 100 (which must have linear slope to give an involute), and the common pitch diameter of the worm wheels 40, 42. In turn, the constant of proportionality determines, by a linear function, the generating (base) cone angle of the gear to be made.

Formulae outlined in the above identified prior application and dealing with the spacing of tools in the cutter, and the orientation of the leading tool faces, are applicable here, except that the "helix angle" of gear 12 should be taken arbitrarily at the generating cone half-way across the face width of the gear; the "circular pitch" of gear 12 is the arc distance between adjacent teeth on the base cone half-way across the face width; the "center distance spacing" of cutter and work axes is taken along the above defined perpendicular bisector of a cone element; and the "base circle radius" of gear 12 is the radius of the generating cone half-way across the face width.

Figure 1:
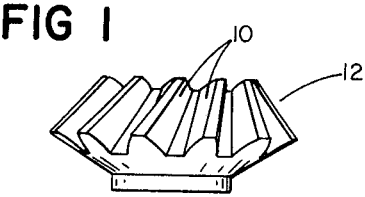
FIG. 1 is a perspective view of a spiral bevel pinion gear.
Figure 4:
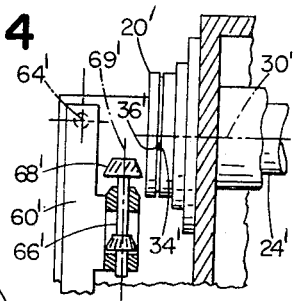
FIG. 4 is a fragmentary semi-schematic view of another embodiment having a single cutter, taken along the feed axis.
Figure 3:
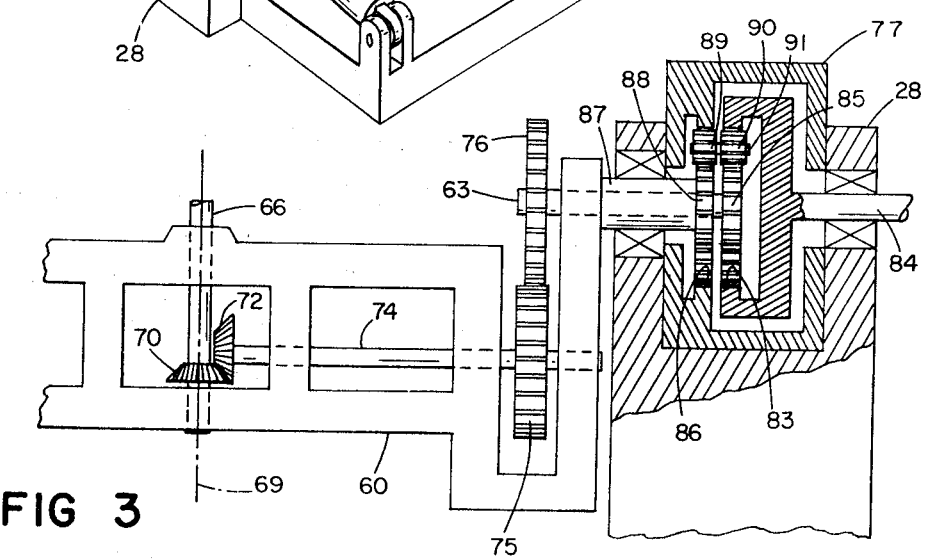
FIG. 3 is an elevational view, partly sectioned and enlarged, of a portion of the apparatus of FIG. 2.

In apparatus for production of gears having non-conical hyperboloidal pitch surfaces (a mating pair of which gears have non-intersecting, non-parallel axes), it is necessary that the feed and workpiece axes both lie outside the plane of the profile generating cutting edges, and that the feed axis not intersect the workpiece axis. With these conditions, the general mechanical arrangement shown in FIGS. 2 and 3 can be used for a machine having a single cutter 20' (FIG. 4). Workpiece axis 69' lies between feed axis 64' and the plane of cutting edges 36'. In its simplest form, two separate machines of this construction would be used to respectively generate the opposing profiles of such a gear.

Other embodiments will occur to those skilled in the art and are within the following claims.

I claim:

1. Apparatus for generation gear tooth profiles of hyperboloidal form comprising a cutter having profile generating cutting edges mounted for movement about a common cutter axis, and a support for a workpiece rotatable about a workpiece axis, said support and said cutter being mounted for relative pivotal movement about a feed axis non-parallel to said workpiece axis, said support and said cutter having basic rates of simultaneous movement about said workpiece and cutter axes, respectively, in the absence of said pivotal movement, in ratio dependent upon the number of said cutting edges to the number of teeth in the gear, to cause continuous indexing of said workpiece as said cutting edges make successive cuts adjacent said profiles, said support and said cutter being mounted so that one of said basic rates is increased or decreased, upon the occurrence of said pivotal movement, by a differential rate dependent upon the angular rate of said pivotal movement, so that successive cuts adjacent each tooth profile will follow the desired contour thereof.

2. The apparatus of claim 1 wherein, to generate said profiles in a bevel gear, said cutting edges lie along straight lines in substantially a single plane, and said feed axis lies in said plane and intersects said workpiece axis.

3. The apparatus of claim 1 wherein said workpiece axis intersects said feed axis at 90°.

4. The apparatus of claim 2 wherein there are two said cutters having axes lying in a single cutter axis plane, and, when said workpiece axis is perpendicular to said cutter axis plane, the perpendicular bisector of an element of the pitch cone of the gear being made intersects said workpiece axis and a said cutter axis.

5. The apparatus of claim 2 wherein the vertex of the pitch cone of the gear being made lies on said feed axis.

6. The apparatus of claim 1 further comprising a gear train for carrying out pivotal movement of said support without affecting the rate of movement of said support about said workpiece axis.

7. The apparatus of claim 1, wherein, to generate said profiles in a gear having a non-conical hyperboloidal pitch surface, said cutting edges lie along straight lines in substantially a single plane, said feed and workpiece axes do not lie in said plane, and said feed and workpiece axes do not intersect each other.

* * * * *